Dec. 27, 1960   J. L. BONANNO   2,966,620
SOLID METALLIC RECTIFIER
Filed Feb. 28, 1958
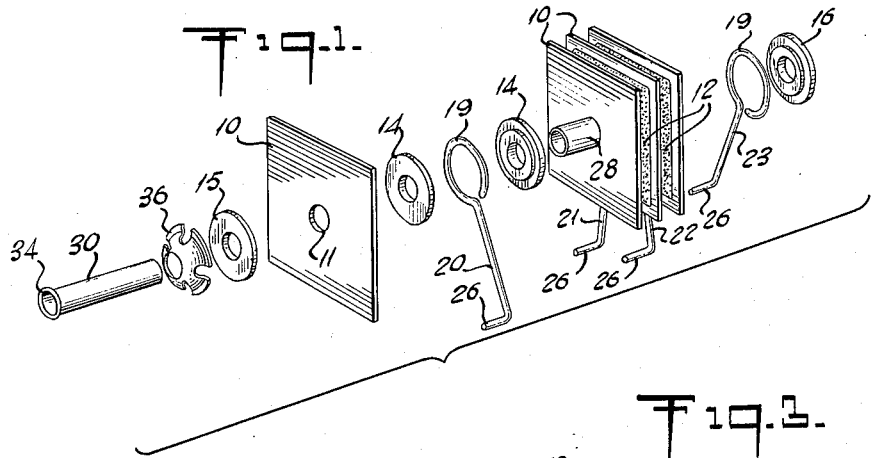
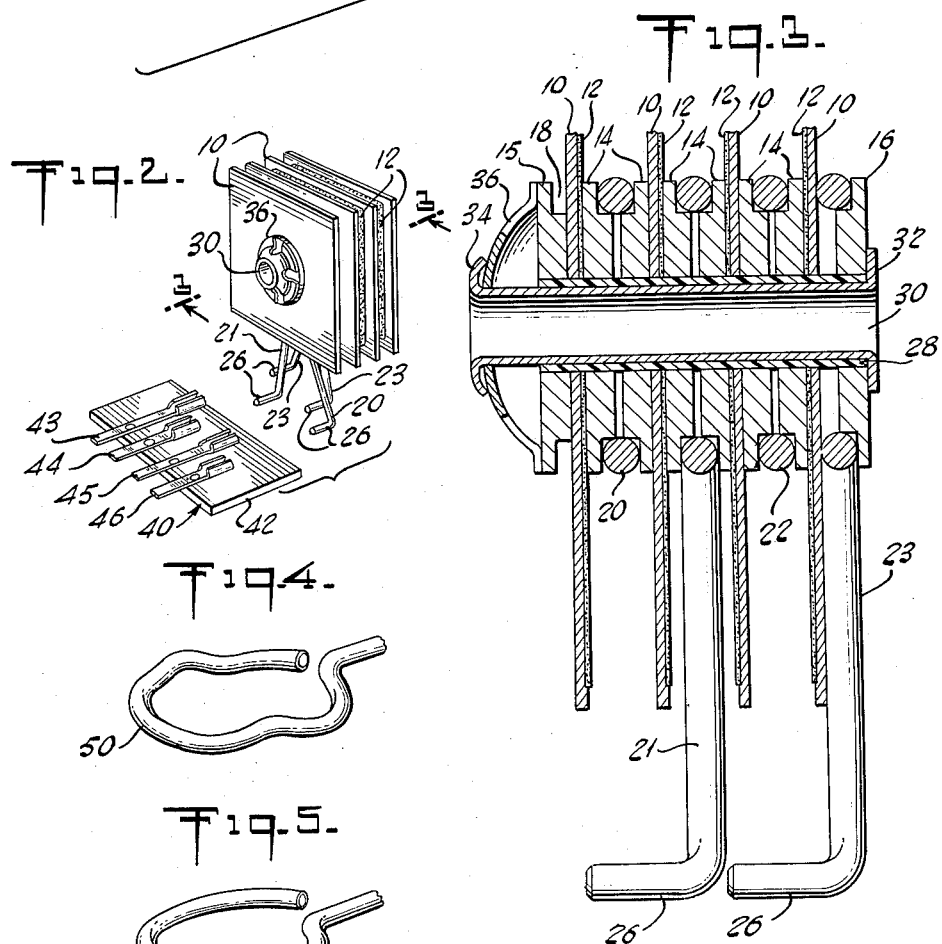
INVENTOR
JOSEPH L. BONANNO
BY
Moses, Nolte, & Nolte
ATTORNEYS United States Patent Office 2,966,620
Patented Dec. 27, 1960

2,966,620

SOLID METALLIC RECTIFIER

Joseph L. Bonanno, South Orange, N.J., assignor to The Lionel Corporation, New York, N.Y., a corporation of New York Filed Feb. 28, 1958, Ser. No. 718,354

7 Claims. (Cl. 317—234)

The present invention relates to metallic rectifiers consisting of an assembled stack of rectifier elements which may be of the copper oxide or selenium type or other known types.

Metallic rectifiers, sometimes called junction rectifiers, generally consist of a stack of metallic and semiconductive elements having input and output leads. It is an object of the present invention to provide a more economical rectifier of this type by utilizing inexpensive spacers and leads and enabling simplified plug-in connection of the rectifier.

Another object of the invention is to provide for the uniform distribution of pressure on the rectifier plates by the use of spring means which may be in the form of a spring washer on one end of the stack of elements or may be provided by the input or output leads themselves.

Another object of the invention is to provide for plug-in connection of the rectifier to a suitable socket. This is done according to one embodiment of the invention by using rigid input and output leads and extending the ends of the leads in substantially the same direction.

The above objects and other objects and advantages of the invention will be apparent from the following description and the drawing in which:

Fig. 1 is an exploded view of a rectifier according to the invention;

Fig. 2 is a perspective view of a rectifier and a socket therefor.

Fig. 3 is a cross-sectional view of the rectifier; and

Figs. 4 and 5 are perspective views of modified forms of the loops of the leads.

Referring to the drawings, there is shown a rectifier consisting of a plurality of rectifier plates 10. Each of these plates is a metallic plate having a central perforation 11, and a semi-conductor 12 covering at least a portion of one face of the plate. As is well known in the art, the rectifier plates may be of various types. One commonly used type of rectifier is a copper plate having a copper oxide coating thereon. Another common type of rectifier utilizes an iron or other metallic plate having a selenium coating or film thereon. The rectifier plates are separated by a plurality of identical spacer washers 14. Washers 15 and 16, preferably the same as the washers 14, may be placed on ends of the stack. Each of the spacer washers and end washers have a peripheral groove 18. Input and output leads 20—23 are connected to the washers. Each lead is provided with a loop 19 lying in the recesses 18 of washers 14—16. Leads 20 and 22 may be the input leads, and leads 21, 23 may be the output leads. Wires 20—23 are thick enough so that the loops 19 will be tightly clamped in the recesses when the rectifier is assembled. The outer ends 26 of the lead wires are arranged to extend in the same general direction and the lead wires are stiff or rigid enough so that the ends 26 may form terminal pins capable of supporting the rectifier. In the particular embodiment herein illustrated, the ends 26 are bent at right angles.

An insulating mounting tube 28 extends through the central perforations 11 of plate 10 and the washers 14—16. An eyelet 30 extends through tube 28 and the ends of the eyelet 30 are bent over or upset at 32 and 34 so to tightly clamp the entire stack of elements. In order to provide a sufficient and uniform pressure between the elements, a spring washer 36 may be provided between one end of eyelet 30 and the outermost washer 15.

The ends 26 of leads 20—23 preferably lie in the same plane and extend in the same direction. Although these ends are shown as being bent at right angles, it will be apparent that they may be formed in other ways, the essential thing being that they extend in substantially parallel directions so that the entire unit may be plugged into a socket. The rectifier can be plugged into socket 40 consisting of a plate 42 having spring clip terminals 43—46 adapted to receive the terminal pins 26.

Referring particularly to Figs. 4 and 5 there are shown two modified forms which the loops of the lead wires may take. In Fig. 4 the loop 50 is skewed at a number of points therearound, so that there are a plurality of portions which do not lie in the same plane. It will be evident, therefore, that the loop 50 has a plurality of spring-like portions which function as a spring washer. Similarly loop 52 of Fig. 5 is skewed so that it does not lie in a single plane and when compressed between the spacer washers 14, it likewise acts as a spring washer. When lead wires having loops of the form shown in Figs. 4 and 5 are used, the spring washer 36 may be dispensed with.

The rectifier plates may be arranged in various ways and in the preferred form illustrated in Fig. 3 half of the rectifier plates 10 have their semiconductive coatings on the right side and the other half of the plates 10 have their semiconductive coatings on the left side. It will be evident that actually all the plates are of the same construction, but that half of the plates have been turned.

Although I have shown and described only one examplary embodiment of my invention and some modifications thereof, it will be apparent to those skilled in the art that many other modifications and variations of the invention may be made without departing from the spirit and scope of my invention as defined in the following claims.

I claim:

1. A rectifier comprising a stack of assembled coaxial washer elements including a plurality of metallic plates each having a semiconductor on one face, a plurality of spacer washers separating the plates from one another, rigid input and output leads for said rectifier each having one end connected to said spacer washers, said ends of said leads being axially compressible spring means located between said washer elements; and fastening means extending through said washer elements holding them tightly assembled.

2. A rectifier comprising a stack of assembled coaxial washer elements including a plurality of metallic plates each having a semiconductor on one face, a plurality of spacer washers separating the plates from one another, rigid input and output leads for said rectifier connected to said spacer washers, said stack of elements including axially compressible spring means; and fastening means extending through said washer elements holding them tightly assembled, the ends of all said leads constituting a group of terminal pins extending in the same direction for facilitating plug-in mounting of the rectifier, the spacer washers having annular recesses and the leads being wires having loops in said annular recesses, the thickness of the wires being such that they are tightly clamped in the recesses.

3. A rectifier according to claim 2 wherein a pair of spacer washers are located between each pair of adjacent plates with the recesses adjacent each other so as to form a channel, the loops of the wires being in the channels.

4. A rectifier according to claim 2 wherein at least one of the loops is skewed so that it constitutes said spring means when compressed in the assembled stack.

5. A rectifier according to claim 4 wherein the skewed loop has a plurality of portions skewed in different directions.

6. A rectifier comprising a stack of assembled coaxial washer elements including a plurality of metallic plates each having a semiconductor on one face, a plurality of identical spacer washers on each face of the plates and separating the plates from one another, said spacer washers having peripheral recesses, rigid input and output lead wires for said rectifier having loops lying in the recesses of said spacer washers, said loops being skewed to form axially compressible spring means; and fastening means extending through said washer elements holding them tightly assembled, the outer ends of all said leads constituting a group of substantially parallel terminal pins for plug-in mounting of the rectifier, and a socket having a plurality of aligned receptacles for receiving all said terminals.

7. A rectifier according to claim 6 wherein the outer ends of the leads having a right angle bend and the bent ends of the leads lie in the same plane.

References Cited in the file of this patent

UNITED STATES PATENTS

| | | |
|---|---|---|
| 2,671,188 | Racine et al. | Mar. 2, 1954 |
| 2,725,503 | Wolf et al. | Nov. 29, 1955 |
| 2,764,717 | Vanderhoof | Sept. 25, 1956 |
| 2,777,100 | Ortega | Jan. 8, 1957 |
| 2,783,417 | Eannarino | Feb. 26, 1957 |